219-121
6/22/82 OR 4,336,439

United States Patent [19]

Sasnett et al.

[11] 4,336,439

[45] Jun. 22, 1982

[54] METHOD AND APPARATUS FOR LASER SCRIBING AND CUTTING

[75] Inventors: Michael W. Sasnett, Los Altos; Richard J. Saunders, San Jose, both of Calif.

[73] Assignee: Coherent, Inc., Palo Alto, Calif.

[21] Appl. No.: 193,330

[22] Filed: Oct. 2, 1980

[51] Int. Cl.$^3$ .............................................. B23K 27/00

[52] U.S. Cl. ..................... 219/121 LH; 219/121 LG; 219/121 LK; 219/121 LR

[58] Field of Search .................. 219/121 LH, 121 LJ, 219/121 LK, 121 LL, 121 LQ, 121 LR, 121 LT, 121 L, 121 M; 350/288, 320; 331/94.5 R

[56] References Cited

U.S. PATENT DOCUMENTS

| | | | |
|---|---|---|---|
| 3,527,520 | 9/1970 | Harris | 350/150 |
| 3,597,578 | 8/1971 | Sullivan et al. | 331/94.5 |
| 3,853,386 | 12/1974 | Ritter et al. | 350/288 X |
| 4,015,221 | 3/1977 | Dalton | |
| 4,093,349 | 6/1978 | Mills | 350/288 |
| 4,116,542 | 9/1978 | Moncur et al. | 219/121 LR X |
| 4,147,409 | 4/1979 | Apfel | 350/288 X |
| 4,252,410 | 2/1981 | Jain | 350/370 |

OTHER PUBLICATIONS

Jenkins and White, *Fundamentals of Optics*, "Quarter--and Half-Wave Plates", Second Edition, pp. 528–531, McGraw-Hill, 1950.

F. O. Olsen, "Cutting with Polarized Laser Beams".

W. H. Southwell, "Multilayer Coating Design Achieving a Broadband 90° Phase Shift", *Applied Optics*, vol. 19, p. 2688, 1980.

W. H. Southwell, "Multilayer Coatings Producing 90° Phase Change", *Applied Optics*, vol. 18, p. 1875, 1979.

*Primary Examiner*—C. L. Albritton
*Attorney, Agent, or Firm*—Limbach, Limbach & Sutton

[57] ABSTRACT

A laser system adapted for a high power laser beam thermally reacting with a target of a rigid material to remove a portion of the rigid material, has a laser generating a high power beam of electromagnetic coherent radiation. The beam is aligned to impinge the material and is controlled by a controlling means such that the portion removed is symmetrically shaped.

15 Claims, 14 Drawing Figures

12 22 14 45° 18 16 45° 22 24 30 10 20

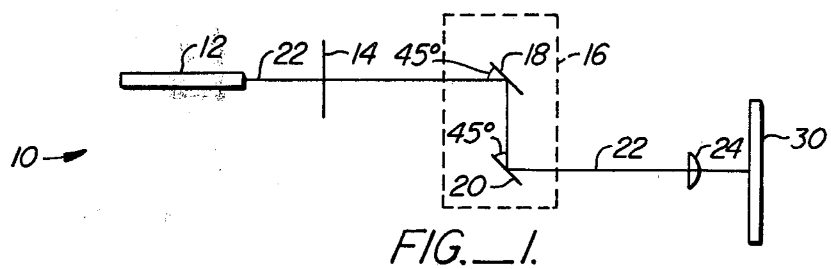
FIG._1.
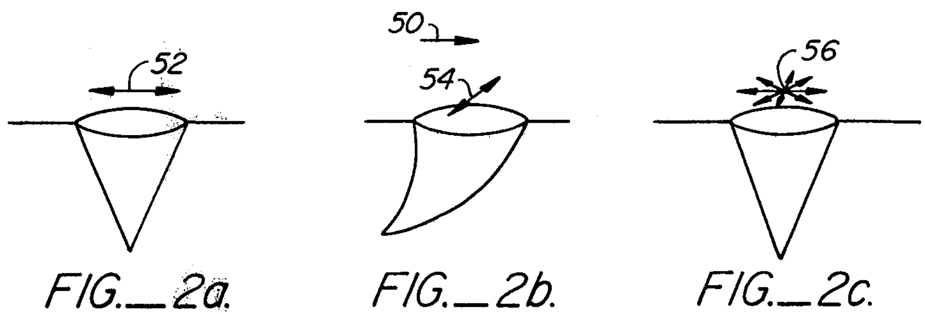
FIG._2a. FIG._2b. FIG._2c.
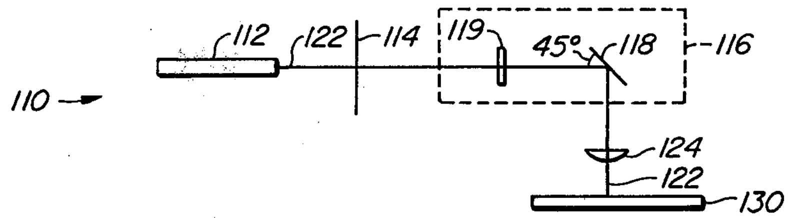
FIG._3.
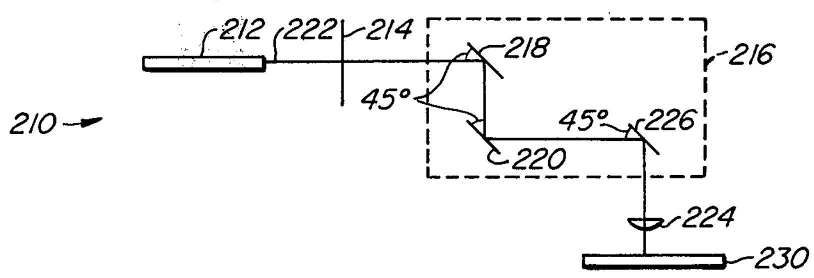
FIG._4.

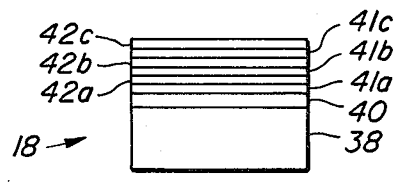
FIG._5.
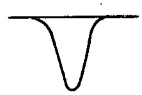
FIG._6a.
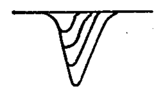
FIG._6b.
FIG._6c.
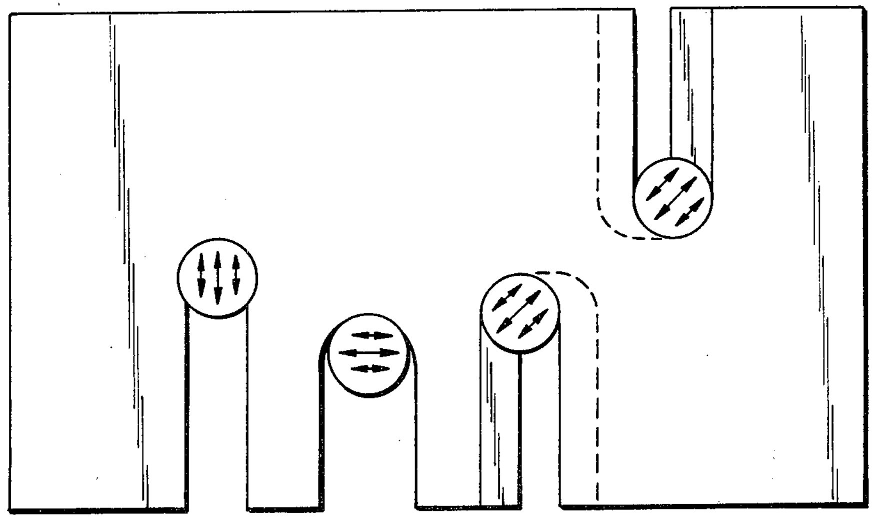
FIG. 7a. FIG. 7b. FIG. 7c. FIG. 7d.
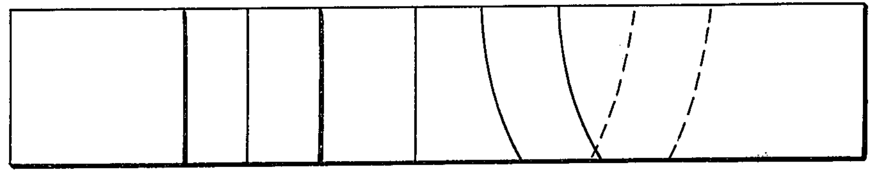
FIG._7.

METHOD AND APPARATUS FOR LASER SCRIBING AND CUTTING

BACKGROUND OF THE INVENTION

The present invention relates to a laser system and a method of use, and more particularly to a method and an apparatus for a high power laser beam capable of thermally reacting with a target of a rigid material to create cuts and apertures of higher symmetry in the material than heretofore achieved.

Method and apparatus for producing high power laser beams have found many uses and applications in the art, including the use of such a device to scribe or cut a target comprised of a rigid material, such as metals, wood, rubber, plastics or ceramics. By scribing or cutting it is meant that the high power laser beam thermally reacts with the target vaporizing the material to create apertures or holes discretely or continuously in said material. Conventionally, such an apparatus has used a $CO_2$ laser, operating at 10.6 microns, and having a power output of at least 10 watts. The beam output from such a laser is focussed onto the target material. The target material includes rigid materials such as metals, wood, rubber, plastics or ceramics. Heretofore, it has been felt that the polarization of the beam is unimportant in the application of scribing or cutting of the rigid material. In particular, it was believed that the state of polarization of the beam made no difference in the size or shape of the aperture which resulted from the beam thermally reacting with the material.

U.S. Pat. No. 4,116,542 teaches a method and apparatus for reducing the coherence and for smoothing the power density profile of a collimated high power laser beam, in which the beam is focussed at a point on the surface of a target fabricated of material having a low atomic number. In that patent, it was disclosed that the laser beam incident upon the target material, in one example, was shown to be a circularly polarized beam. However, the use of a circularly polarized beam in that patent served the function of reducing the coherence and for smoothing the power density profile of the laser beam. Moreover, the beam was circularly polarized in order that the reflected beam from the target material would not be reflected back into the amplifier section of the laser, thereby overcoming the problem of potential damage to the laser. It is clear, from a reading of that patent, that it does not teach the particular method and apparatus for a high power laser beam thermally reacting with a target of a rigid material to create symmetrically shaped apertures in the material.

In *Applied Optics,* Vol. 19, page 2688 (1980), and Vol. 18, page 1875 (1979), a quarter wave reflector using multi-layer dielectric material is disclosed. However, the apparatus and method of thermally reacting a high power laser beam with a rigid material is not taught.

In a paper entitled "Cutting With Polarized Laser Beams" by F. O. Olsen, presented at the German Welding Institute Conference in Essen, in May 1980, and published subsequently in the Digest of that meeting, the author described the influence of the plane of polarization of the beam on the shape of the apertures created thereby.

SUMMARY OF THE INVENTION

In accordance with the apparatus of the present invention, a laser system adapted for generating a high power laser beam which is aligned to impinge a target of a rigid material to thermally react with the material to remove a portion therefrom, has a laser means for generating the high power beam of electromagnetic coherent radiation having a state of polarization. The beam is aligned to impinge the material. Controlling means are provided to control the polarization of the beam with respect to the material such that the portion removed is symmetrically shaped.

The present invention also provides a method for using the foregoing apparatus.

BRIEF DESCRIPTION OF THE DRAWINGS

FIG. 1 is a schematic side view of one embodiment of the apparatus of the present invention.

FIGS. 2(*a–c*) are magnified schematic views of apertures of the prior art (FIGS. 2*a* and 2*b*) and of the present invention (FIG. 2*c*), created by thermally reacting the laser beam with a target of rigid material.

FIG. 3 is a schematic side view of another embodiment of the apparatus of the present invention.

FIG. 4 is a schematic view of yet another embodiment of the apparatus of the present invention.

FIG. 5 is an enlarged schematic side view of one component, a reflector having a phase shift, used in the apparatus of the present invention.

FIGS. 6(*a–c*) are side views of a cavity formed by a stationary beam (FIG. 6*a*), and cavities developed in time by a moving beam with the direction of polarization parallel and perpendicular to the direction of motion respectively (FIGS. 6*b* and 6*c*).

FIGS. 7(*a–d*) are top and side views of a row of cuts created by a laser whose direction of polarization is parallel to the direction of the cut (FIG. 7*a*), perpendicular to the direction of the cut (FIG. 7*b*) and at an oblique angle to the direction of the cut (FIGS. 7*c* and 7*d*).

DETAILED DESCRIPTION OF THE INVENTION

Referring to FIG. 1, there is shown a laser system 10 of the present invention. The system 10 comprises a laser 12, such as a $CO_2$ laser, capable of generating a high power beam of electromagnetic coherent radiation, typically at 10 watts. The beam is aligned to traverse along path 22. A linear polarizer 14 linearly polarizes the beam. The path 22 then enters into a quarter wave means 16. The quarter wave means 16 comprises a first reflector 18 and a second reflector 20. The beam travels along the path 22 and is aligned to impinge the first reflector 18 at forty-five degrees (45°) from the normal to reflect therefrom, to impinge the second reflector 20 also at forty-five degrees (45°) from the normal and to reflect therefrom. From the quarter wave means 16 the beam travels along path 22 and is focussed by the focussing beams 24, which is simply a focusing lens. The focussing means 24 focusses the beam onto a target 30, which typically is of a rigid material, such as steel, stainless steel or ceramics. The quarter wave means 16 is exactly analogous to a transmissive quarter wave plate. The quarter wave means 16 has an angle of retardation of substantially 90°. Having the properties of a transmissive quarter wave plate, the quarter wave means 16 converts the linearly polarized beam from the linear polarizer 14 into a circularly polarized beam. The linearly polarized beam may also be from the laser 12, which innately may have a direction of linear polarization. In FIG. 1 the quarter wave means 16 is comprised of two identical reflectors, 18 and 20 respectively, each having an angle of retardation of substantially 45°. The particular physical characteristics of the first or second reflectors 18 or 20 respectively and the quarter wave means 16 is the subject of a co-pending patent application by D. Fischer and A. Bloom and assigned to the same assignee as the present application. They will be described hereinafter. From FIG. 1 it is seen that the quarter wave means 16 has at least one reflecting surface, and the beam travelling along the path 22 is aligned to impinge and to reflect from the one reflecting surface.

Referring to FIGS. *2a* and *2b*, there is shown the apertures, greatly enlarged, created by the laser system of the prior art. The direction of the scribe or cutting is shown by the arrow 50. In FIG. *2a* the beam is linearly polarized along the direction shown by arrow 52 which is parallel to the direction of scribing or cutting. The resultant aperture as shown in FIG. *2a* is of a hole that is very straight with maximum penetration. In FIG. *2b* the incident beam is also linearly polarized. However, the direction of polarization is along an axes shown by the arrow 54 which is perpendicular to the direction of travel as shown by the arrow 50. The resultant aperture as seen in FIG. *2b* is of an asymmetric hole which is curved back to the bottom in the direction opposite that of the direction of scribing. In addition, the depth of penetration is not as deep as that shown in FIG. *2a* where the direction of polarization is parallel to the direction of travel.

Referring to FIG. *2c*, there is shown an enlarged schematic view of the aperture created by the laser system of the present invention. The beam is circularly polarized as shown by the arrows 56. By circularly polarizing the beam, the particular direction of polarization is effectively nulled. Without any preferential direction of polarization, the hole produced would be clean, deep, and symmetrical, just as that produced if the beams were linearly polarized along the direction of travel. Thus, with a circularly polarized beam, the effect of nonalignment of the direction of polarization with the direction of travel is eliminated.

The theoretical basis for this invention is as follows:

When a material is being cut by a focussed beam that's moving relative to the material, the forward edge of the cut intercepts the beam at an oblique angle that depends on the speed of the cut and rate of material removal. The absorption and reflection characteristics for the beam then depend strongly on the orientation of the polarization with respect to the surface of the cut. If the beam is polarized parallel to the direction of beam motion then the electric field vector is nearly normal to the surface being heated and cut. This is the condition that results in high absorption and low reflectivity. The cutting speed will be high for this case as more energy is absorbed on the surface undergoing the cutting reaction and relatively little energy is reflected on through the cut and wasted.

For the case where the polarization is aligned across the cut direction the optical absorption on the surface being cut is relatively low and more of the energy is reflected through and wasted. For this case, the cutting speed is between 50% and 70% of the speed attainable with parallel polarization. Furthermore, the width of the cut (kerf width) is different in the two cases with the maximum kerf width being made by the beam with polarization across the cut direction. This is a further disadvantage for that orientation.

While the two cases described above result in different maximum cutting speeds and different kerf widths, they do at least provide cuts that extend straight through the material in the direction that extends the original direction that the beam propagates. A third case of interest is where the beam is polarized neither along nor across the cut direction but at some intermediate angle. In this case, maximum absorption occurs on one side of the front edge of the cut and minimum absorption of energy occurs at the other side. The result is an undercutting effect on the side where the absorption is high and a cut that is neither perpendicular to the material surface nor aligned with the beam propagation direction. See FIGS. 7(*a*–*c*). It is surmised that energy reflected from the one side of the cut is directed back to the other side in wave guide-like fashion to assist in undercutting that side. The polarization after reflection may very well be scattered on reflection, thereby making the absorption of this reflected energy higher on the undercut side. Confirmation of this effect comes when the direction of the cut is reversed as the undercutting occurs on the opposite side of the cut. See FIG. 7*d*. One manifestation of this effect is that when cutting a closed shape, a circle for example, the part enclosed by the cut will remain captured in the piece it was cut from. By converting a plane polarized beam to circular polarization and using that circular polarization for cutting the disparity in cutting speeds as well as the angled-cut effect is eliminated. In addition, the cutting speeds attainable with circularly polarized light are as high as the highest speed possible with light polarized parallel to the direction of the cut.

LASER SCRIBING

When using high power energy laser for cutting or scribing, the laser outputs a series of pulses. Each pulse of high power energy laser creates a hole or cavity in the rigid material. If the beam is not in motion relative to the ceramic the cavity is symmetrically shaped and is oriented straight into the ceramic, normal to the surface and in-line with the beam propagation direction as shown in FIG. 6(*a*).

When the beam is in motion relative to the rigid material and is incident on the material as a series of pulses of about 100–300 microsec duration, the beam (or the material) is moving at a speed of about 10 inches per second with pulse repetition rates of between 1500 and 2000 pulses per second, a row of cavities (called the scribe line) with a spacing of from 0.005 inch to 0.007 inch between cavities results. During the period of the pulse the material moves about 0.001–0.003 inch. This keeps the beam impinging on the forward edge of the cavity. If the beam is polarized parallel to the direction of motion the absorption, as previously discussed, is high and the cavity developes in time as shown in FIG. 6(*b*).

When the polarization is oriented across the direction of motion the absorption is low on the forward side of the cavity and energy is reflected backward as the beam moves forward. Time development of the cavity is then as shown in FIG. 6(*c*). The backward-reflected energy vaporizes material under the trailing edge of the cavity.

Referring to FIG. 3, there is shown yet another embodiment of the laser system 110 of the present system. The laser system 110 is exactly similar to the laser system 10 of FIG. 1, with the exception of the quarter wave means 116. Similar to the components previously described, the laser system 110 comprises a $CO_2$ laser 112 emitting a beam of electromagnetic coherent radiation aligned to traverse along path 122 through a linear polarizing means 114. The linearly polarized beam passes through the quarter wave means 116 and is converted to a circularly polarized beam by the quarter wave means 116. The beam is then focussed by focussing means 124 to impinge the target 130. The quarter wave means 116 of FIG. 2 has the same characteristics as the quarter wave means 16 of FIG. 1; namely, the quarter wave means 116 has an angle of retardation of substantially 90°. The quarter wave means 116 comprises a transmissive plate 119 and a reflector 118. The reflector 118 is similar to the reflector 18 shown in FIG. 1. The transmissive plate 119 is similar in characteristics to the reflector 118 in that it has an angle of retardation of substantially 45°. The transmissive plate 119 is in essence a one-eighth wave plate.

Referring to FIG. 4, there is shown yet another embodiment of the laser system 210 of the present invention. With the exception of the quarter wave means 216 of FIG. 4, the laser system 210 is exactly the same as the laser system 110 of FIG. 3 or the laser system 10 of FIG. 1. The quarter wave means 216 comprises a first, second, and third reflecting means, 218, 220, and 226 respectively. Each of the first, second, and third reflecting means 218, 220, and 226 respectively, has an angle of retardation. The sum of the angle of retardation of each of the first, second and third reflecting means 218, 220 and 226 respectively, is substantially 90°. Thus, from the quarter wave means 216 a circularly polarized beam emerges.

It should be self-evident that the quarter wave means in the apparatus of the present invention may comprise a plurality of reflecting means. Furthermore, the quarter wave means may be reflective or transmissive in nature, so long as the quarter wave means creates a circularly polarized beam from an incident linearly polarized beam. Furthermore, additional optical means may be employed in the system 10, 110 or 210 of the present invention to maintain the phase relationship, i.e. optical means that have zero phase shift, to deliver the beam onto the target material. Such optical elements may be placed any where along the beam path 22, 122 or 222. These elements may be used to create articulated joints or other devices to deliver the beam to the target 30, 130 or 230. Examples of optical elements with zero phase shift include: reflecting means in which the beam is incident thereon at near normal incidence; and two reflecting means having equal but opposite amount of angle of retardation with the beam incident upon and reflecting from the two reflecting means, one after another thereby cancelling out the phase shift created by each reflecting means.

Referring to FIG. 5, there is shown a reflecting means 18 used in the quarter wave means 16, 116 or 216. The reflecting means 18 comprises a substrate 40. A plurality of first dielectric material, 41*a*, 41*b* and 41*c* and a plurality of second dielectric material 42*a*, 42*b* and 42*c* are on substrate 40. The first and second dielectric materials, 41 and 42 respectively, are different with the first and second dielectric materials 41 and 42 on the substrate 40 in alternate layers. Typically, the substrate is made from a metal, such as silver or aluminum, with the first dielectric material being Germanium (Ge) or $TiO_2$ and the second dielectric material being Zinc Sulfide (ZnS), $ThF_4$ or $SiO_2$. The substrate 40 is typically one micron in thickness with the first and second dielectric materials 41 and 42 respectively being also on the order of one micron in thickness. Because of the thinness of the layers, they are typically placed on a support 38. One method of manufacturing the reflecting means 18 is by alternatingly evaporating the first and second dielectric materials 41 and 42 respectively onto the substrate 40, which is on a support 38.

What is claimed is:

1. An apparatus adapted for removing a portion of a rigid material by thermal reaction, said apparatus comprising:
laser means for generating a high power beam of electromagnetic coherent radiation characterized by a state of polarization;
means for aligning said beam to impinge said material; and
means for controlling the polarization of said beam with respect to said material wherein said portion removed is symmetrically shaped.

2. The apparatus of claim 1 wherein said controlling means comprises:
polarizing means for linearly polarizing said beam;
quarter-wave means; and
said linearly polarized beam aligned to traverse a path through said quarter-wave means to produce a circularly polarized beam.

3. The apparatus of claim 2 wherein said aligning means comprises:
focusing means for focussing said beam onto said target.

4. The system of claim 3 wherein said quarter-wave means has at least one reflecting surface and said path includes impinging and reflecting from said surface.

5. The system of claim 4 wherein said quarter-wave means further comprises:
a plurality of reflecting means, each reflecting means having an angle of retardation;
the sum of the angle of retardation of all the reflecting means is substantially ninety degrees; and
said path includes impinging each reflecting means and reflecting therefrom.

6. The system of claim 5 wherein said quarter-wave means comprises two reflecting means each having an angle of retardation of substantially forty-five degrees.

7. The system of claim 4 wherein said reflecting means comprises:
a substrate;
a plurality of first dielectric material;
a plurality of second dielectric material;
said first and second dielectric materials being different; and
said first and second dielectric materials on said substrate in alternate layers.

8. The system of claim 7 wherein said substrate is metal.

9. The system of claim 8 wherein said first dielectric material is a material selected from the group consisting of Ge and $TiO_2$.

10. The system of claim 9 wherein said second dielectric material is a material selected from the group consisting of ZnS, $ThF_4$ and $SiO_2$.

11. The system of claim 6 further comprising zero phase shift means.

12. The system of claim 11 wherein said zero phase shift means comprises:
a reflecting means and said beam is incident thereon at near normal angle of incidence.

13. The system of claim 11 wherein said zero phase shift means comprises:

two reflecting means, each having equal but opposite amount of angle of retardation; and said beam aligned to impinge both of said reflecting means, one after another, and to reflect therefrom.

14. A method of thermally reacting a high power beam of coherent electromagnetic radiation with a target of a rigid material said method comprising:

generating a high power beam of coherent electromagnetic radiation;

directing said beam along a path through a controlling means to impinge said material;

thermally reacting said beam with said material to remove a portion therefrom; and controlling said beam with said means wherein said portion removed is symmetrically shaped.

15. The method of claim 14 wherein said controlling step further comprises:

generating a circularly polarized beam of radiation.

* * * * *